United States Patent Office 3,094,421
Patented June 18, 1963

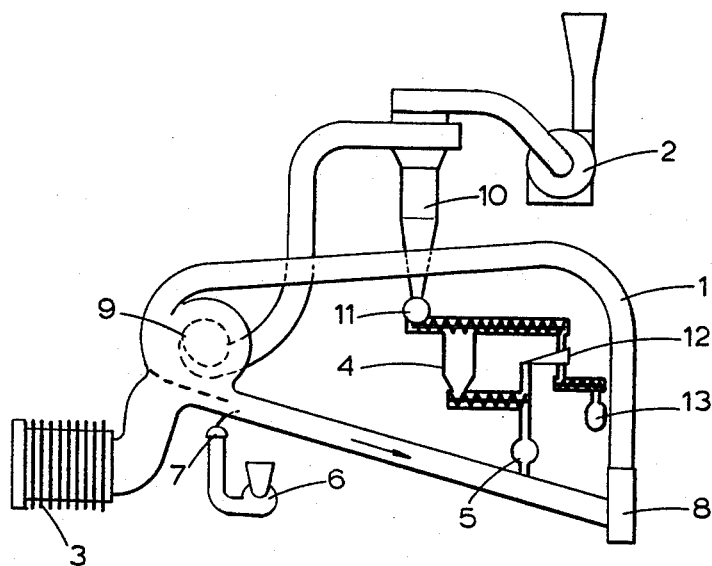

3,094,421
DRYING GLUTEN AND DOUGH-LIKE MATERIALS
Edward J. Parker, Slough, England, assignor to Starch Products Limited, Langley County, England, a body corporate of Great Britain
Filed July 7, 1961, Ser. No. 133,753
3 Claims. (Cl. 99—199)

This invention relates to the treatment of materials and more especially the drying of hydrated wheat gluten and other dough-like or paste-like materials.

It is well known that when a substance in the form of large particles can be dried whilst suspended in a stream of hot air, the same substance can be dried more effectively and economically when the size of the particles is reduced.

In order to obtain suspension of gluten and similar dough-like materials into the hot air stream of a pneumatic dryer, it is usual to pre-treat the material by intimately mixing it with previously dried product so that the feed material is rendered more friable and less sticky, thereby to facilitate breaking the feed product into small and distinct particles in the hot air stream of the pneumatic dryer and to reduce the tendency for the particles of feed product to agglomerate or to stick to the walls of the drying apparatus during the drying process.

Applicants have discovered that they can successfully and advantageously dry hydrated wheat gluten and other dough-like materials without pre-mixing with dried product and without necessity of any pre-treatment whatsoever by shredding the dough directly into the hot air stream in such manner and position that fine shreds of feed material are immediately subjected to a blast of hot dry air and carried in suspension in the hot air stream which is confined within a straight line of ducting leading into a disintegrator.

The fine shreds of feed material are, immediately after entering the hot air stream, additionally subjected to a blast of dried and semi-dried product carried in circulation in the normal operation of the pneumatic dryer. The shredded form of feed exposes a large surface area of products to the drying medium and evaporation of moisture is thereby facilitated. At the same time the rapidly drying product is being impregnated and mixed with the stream of dry and semi-dry product in circulation so that when the stream of particles reaches the disintegrator the material is relatively non-sticky and friable and will be further broken into smaller fragments during passage through the disintegrator and the material may from thence be carried in the stream of hot air in ducting and taken through changes of direction without the particles sticking together or to the walls of the ducting.

The invention will be further described with reference to the accompanying drawing where one embodiment is schematically illustrated and wherein 1 represents ducting for the circulation induced by fan 2 of air heated on admission at 3. In starting up the plant dried product from hopper 4 is fed into circulation through feeder and air lock 5, wet feed product is led into circulation through extruder or pump 6, and shredding arrangement 7, preferably at the point immediately following the junction of the hot air coming from the heater 3 and the dry and semi-dry product returning in circulation.

The wet feed product will be blasted by hot air and by dry and semi-dry product in circulation and will be carried in a straight line to the disintegrator 8, a considerable amount of moisture will be evaporated from the product during transit from feed point to disintegrator and the products will be further mixed and broken to finer particles whilst passing through the disintegrator. The semi-dry product is then carried, through a curved path if desired, to a separator 9 where the lightest particles of the product are caused to be carried in the air stream into a clyclone 10 where the product is removed through air lock 11 and conveyed to sieve 12 and thence to discharge outlet 13. The sieved tailings may be returned into the system through air lock 5.

The heater 3 is suitably a steam coil thermostatistically controlled from the outlet temperature of the dryer and the shredder 7 advantageously comprises a plurality of nozzles supplied with the moist gluten by the pump 6 and feeding it into circulating stream of hot air as it comes from the centrifugal separator 9 on the way to the disintegrator 8 which in this embodiment is a rotor with radial spokes adapted to sever the shreds into fragments.

By the present invention improved methods and apparatus for drying dough-like and paste-like materials are obtained.

I claim:

1. A method of drying tacky dough and forming it into dried particles without the necessity of pretreatment comprising the steps of shredding the dough into a passage, forcing a stream of hot dry air and previously semi-dried particles of the dough through the passage to break up the shreds of dough and impregnate the shreds with the semi-dry particles, evaporating a substantial portion of the moisture from the shredded dough and semi-dried particle mixture while conducting it through said passage, exhausting the mixture into a disintegrator to further break up said mixture, conducting the hot air and broken up mixture from the disintegrator to a separator, separating the lighter dried particles of the mixture from the semi-dried heavier particles of the mixture in the separator, conducting the lighter dried particles of the mixture to an exhaust conduit, returning the heavier semi-dried particles of the mixture from the separator to the inlet of said passage where they are mixed with said stream of hot air before it reaches the point where the dough is shredded into said passage.

2. A method as defined in claim 1, wherein said lighter dried particles contain tailings, sifting the dried particles exhausted from said separator so as to separate said tailings therefrom, conducting said tailings into said passage at a point between the disintegrator and the point where said shredded dough enters said passage.

3. A method as defined in claim 1, wherein said dough comprises hydrated wheat gluten.

References Cited in the file of this patent

UNITED STATES PATENTS

| 2,677,613 | Shiah | May 4, 1954 |
| 2,705,679 | Griffiths | Apr. 5, 1955 |
| 2,785,070 | Kester | Mar. 12, 1957 |